United States Patent [19]
Thompson

[11] Patent Number: 6,043,845
[45] Date of Patent: Mar. 28, 2000

[54] VIDEO CAPTURE AND COMPRESSION SYSTEM AND METHOD FOR COMPOSITE VIDEO

[75] Inventor: Peter A. Thompson, Millbrae, Calif.

[73] Assignee: Logitech, Fremont, Calif.

[21] Appl. No.: 08/920,386

[22] Filed: Aug. 29, 1997

[51] Int. Cl.[7] .................................................. H04N 7/18
[52] U.S. Cl. ...................... 348/390; 348/391; 348/557; 348/502
[58] Field of Search ................................... 348/390, 391, 348/392, 393, 384, 386, 29, 30, 34, 264, 502, 557, 642, 630; 382/166, 167, 246

[56] References Cited

U.S. PATENT DOCUMENTS

| | | | |
|---|---|---|---|
| 4,731,646 | 3/1988 | Kliem ........................................ | 348/24 |
| 5,142,272 | 8/1992 | Kondo ...................................... | 348/21 |
| 5,225,904 | 7/1993 | Golin et al. ............................. | 348/384 |
| 5,408,267 | 4/1995 | Main ........................................ | 348/254 |
| 5,608,864 | 3/1997 | Blindish et al. ........................ | 395/507 |
| 5,675,382 | 10/1997 | Bauchspies ............................. | 348/390 |
| 5,883,670 | 3/1999 | Sporer et al. ............................ | 384/512 |

*Primary Examiner*—Anand S. Rao
*Attorney, Agent, or Firm*—Flehr Hohbach Test Albritton & Herbert LLP

[57] ABSTRACT

A system and method is disclosed for compressing and decompressing composite video signals. In one type of operation a composite video signal (e.g., an NTSC signal) is sampled and the samples compressed into 3 or 5 bit composite values, depending on the system mode (PREVIEW or HIGHRES). For the HIGHRES mode the compressed composite values are written into a RAM for at least the four fields associated with the most recent two frames. As needed, the compressed values are transferred to a decoding engine implemented in software. The decoding engine, without any need for phase locked loop circuitry, decompresses the data, and decodes the decompressed digital composite values into YUV and/or RGB values. When the system is in the 5-bit mode, the decoding engine scans and compares all four fields to detect the existence of motion in the image, which could blur the captured image. In regions with motion only a single field of data is used as the source of the image data for those regions. In regions with no motion the information from all four fields is used to reconstruct the image. When the system is in the 3-bit mode, data from only a single field is used to generate the entire captured or displayed image. Also disclosed is a system and method for converting digital video data to composite video signals.

34 Claims, 6 Drawing Sheets

⊠ = selected pixel
○ = unused pixel

1) Extract Y for group from ⊠
2) For each pixel in group,
   Chroma=composite−Y
3) Store Chroma and
   Y in tables

VIDEO CAPTURE AND COMPRESSION SYSTEM AND METHOD FOR COMPOSITE VIDEO

The present invention relates generally to video capture and compression systems, and, particularly, to systems for the capture, compression and storage of multiple frames of a television video signal.

BACKGROUND OF THE INVENTION

Many systems are presently known for the capture and compression of video clips. Typical video capture systems use expensive television decoder chips with phase locked loop circuits to first convert the analog video signal into RGB or YUV formatted digital video data and then send the digital video data to a hard disk or other storage device at between 8 and 24 bits per pixel (bpp). Superior systems use hardware to compress the YUV or RGB data using the discrete cosine transform (DCT), vector quantization, or other methods. These systems require sophisticated and expensive hardware compression integrated circuits (ICs).

Typically, RGB data is sent at 24, 16 or 15 bits per pixel (bpp). YUV data is sent at 16, 12 or 9 bpp. The Palletized RBG data format allows 256 simultaneous colors and is sent at 8 bpp. With hardware compression, the bits per pixel value for good quality images are reduced to 4 and 3 bpp. The estimated image quality for the various formats is: 100% for RGB at 24 bpp and YUV at 16 bpp; 85% for RBG at 16 bpp and YUV at 12 bpp; 75% for RGB at 15 bp; 60% for hardware compression at 3 bpp with JPEG DCT and at 4 bpp with vector quantization; and 50% for Palletized RGB.

Each of these systems requires television decoder chips and sophisticated phase locked loop circuits. None of the systems without hardware compression chips are able to provide high quality compression and high data rates. None of these systems send compressed raw video data directly to an external computer to be stored.

SUMMARY OF THE INVENTION

In summary, the present invention is a video capture and compression system and method that only needs to send 3 bpp to the external computer to maintain a 75% image quality level. This is accomplished using simple circuits that exclude hardware television decoder chips, complex phase locked loop circuits or compression ICs. Thus, the present invention accomplishes the function of video capture using very simple hardware and yields better results than typical video capture systems and comparable results to those provided by the best and very expensive hardware compression chips.

In particular, the method of the present invention takes advantage of the already compressed nature of the NTSC or PAL standard composite TV signal. In the present method the analog video signal is digitized and the active video parts of the digitized composite video data are compressed from 7, 6, 5, 4 or 3 bpp to 5, 4, 3, 2 or 1 bpp, respectively. Without compression a digitized NTSC signal sampled at 14 MHz that has its data samples truncated to 5 bits will retain 75% of its image quality.

The chrominance information in the analog composite signal is encoded into each sample of digital composite video. This encoding allows the composite video sample to hold virtually the same amount of information in each sample as does the luminance (Y) portion alone after the NTSC signal is decoded into separate Y, U and V (or Y, I and Q) components. For the YUV 4:2:2 formatted data (a common formation where there four Y samples for every two U and V samples), this method yields a 100% data space saving. For the YUV 4:1:1 format, this method provides a 50% savings.

A preferred system for use with composite video information from a composite video signal includes a capture unit, a storage unit and a video manipulation block. The capture unit digitizes, captures and compresses the video information from the composite signal. The storage unit stores the modified video data generated by the capture unit. The manipulation block retrieves the stored video information and decodes it into the YUV format, or some other format, such as RGB or YIQ, for later display.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
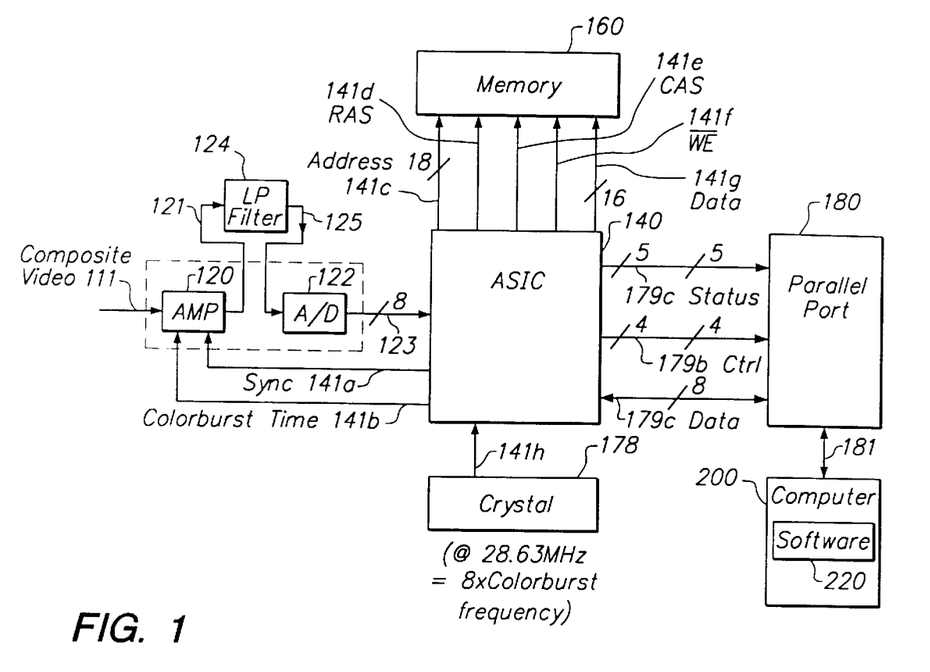
FIG. 1 is a block diagram of a preferred embodiment of the present invention where an analog NTSC signal is captured as a digital video image.

Referring to FIG. 1, there is shown a block diagram of a preferred embodiment 110 of the present invention that can capture, compress, store and decode composite video signals 111, which can be NTSC- or PAL-formatted signals. The preferred embodiment includes an input amplifier 120, a low pass filter (LP) 124, an analog to digital converter (A/D) 122, an application specific ASIC 140 that performs video compression, a memory 160, a parallel port 180 and a computer 200 executing decompression and decoding software 220.

Figure 2A:
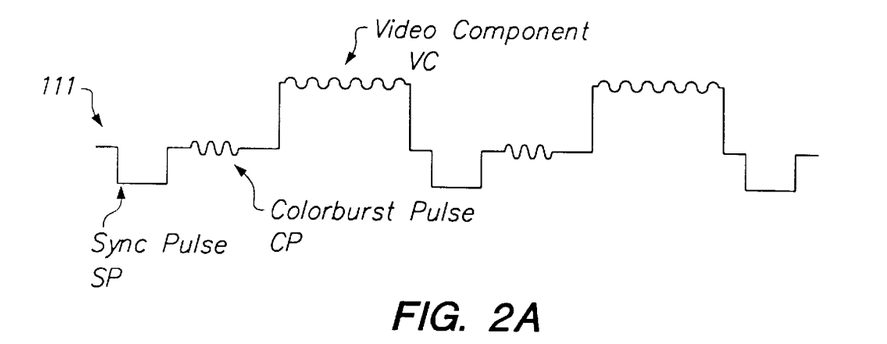
FIG. 2A is a plot of an NTSC signal illustrating key features detected and decoded by the present invention.

Referring to FIG. 2A, there is shown a voltage versus time plot of a representative analog composite video signal 111. The beginning of each line of analog data is prefaced with a sync pulse SP of a particular width. Following the sync pulse SP is a colorburst pulse CP at a predefined frequency to which an NTSC decoder must lock in order to decode the color information in the video component VC of the signal. In NTSC systems, the CP is 9 cycles of a sine wave at 3.57

MHz. Following the CP is the video component VC for the line, which consists of a sine wave at 3.57 MHz modulated by the I and Q chrominance components and a DC voltage for the luminance component. The relationship of the scan lines composing one frame of a TV image is described in reference to FIG. 2B.

Figure 2B:
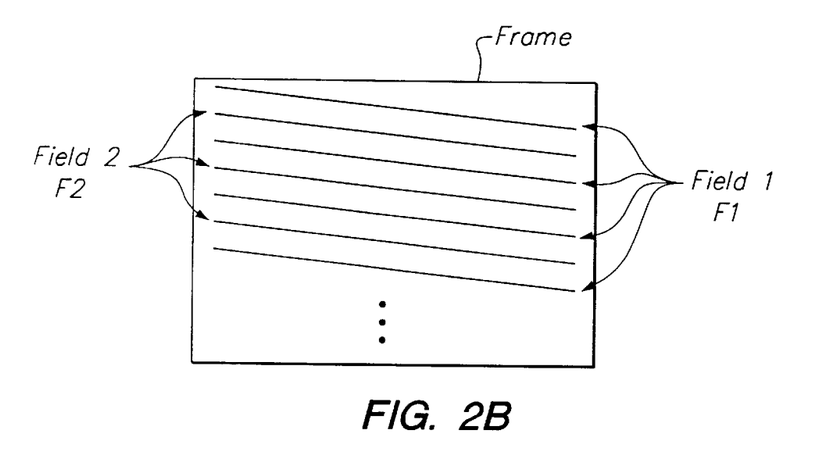
FIG. 2B is a plot of the relationship of the two fields that compose one NTSC frame.

Referring to FIG. 2B, there is shown the pattern of scan lines that make up one frame of a TV image. Each frame consists of two fields F1 and F2 of interlaced lines. Thus, adjacent image lines are from different fields. As a result, motion in the source from which the image was taken causes adjacent lines to include slightly different information. When a still is captured from such an image this motion causes fuzziness in the still. It is one purpose of the present invention to detect and eliminate the effects of such motion to provide the sharpest possible still image captures from composite video images.

Referring to FIG. 1, the amplifier 120 amplifies the input composite signal 111 and passes the amplified signal 121 to the low pass filter 124. The low pass filter 124 performs an anti-aliasing operation on the amplified signal 121 in which high frequency components that might be demodulated as in-band signals are removed from the signal 121. The filtered output 125 is sampled by the A/D 122 at a sufficient frequency to capture the highest-frequency information content in the signal 125 and the resulting samples 123 are output to the ASIC 140 as 1-bit data. In the preferred embodiment, where the composite data 111 is an NTSC video stream, the A/D sampling frequency is 14.3 MHz.

The preferred embodiment operates in one of two modes, PREVIEW, which is a relatively low resolution mode best used to preview from the computer 200 the composite video stream 111, and HIGHRES, which is a high resolution mode for capturing high quality stills from the composite video stream 123. In the PREVIEW mode the ASIC 140 generates compressed video data at 3-bits per sample and in HIGHRES mode the ASIC 140 generates compressed video data at 5-bits per sample.

The ASIC 140 compresses the composite samples in such a manner that the samples can be decoded by the software 220 into digital video signals in a variety of formats (e.g., RGB, YUV) without requiring complex and expensive phase locked loop circuitry. The ASIC 140 controls the gain and burst clamping using control signals that include a sync pulse 141a and a colorburst time pulse 141b. The ASIC 140 detects features in the composite samples 123 corresponding to landmarks in the composite signal 111, compresses the composite samples 123 using a compression method determined by the system mode (PREVIEW or HIGHRES), and then stores the compressed data in the memory 160. The ASIC 140 writes the data to the memory 160 in the conventional manner using 18-bit address lines 141c, a row address strobe (RAS) 141d, a column address strobe (CAS) 141e, a write enable signal WE' 141f and a 16-bit data path 141g. In the preferred embodiment the memory 160 is a half megabyte (MB) memory; larger memories could also be used, as could smaller memories if one were willing to sacrifice image quality as necessitated by storing less data for each image field.

When the system is in the PREVIEW mode, eight fields worth of compressed samples are stored in the memory 160 in respective 64 KB buffers (in the preferred embodiment each field actually occupies 45 KB). When the system is in the HIGHRES mode, four fields are stored in the memory 160 contiguously in 511 KB. In addition to the compressed video samples, other information is stored in the memory, including: colorburst samples (16 per line for PREVIEW mode and 32 per line for HIGHRES mode); MINIMUM and MULTIPLIER values for each block of 16 samples; and timestamp and identifier values. The timestamp is generated by a 14 MHz free-running 6-bit counter 148; one bit of the timestamp and identifier is appended to the data stream 181 as bit 15 of the data stream 181. The timestamp occupies the first few samples of the packed data stream 181 and the rest of the bit 15s are used as identifiers. The identifiers generate a pattern of 1s and 0s for each block of 16 compressed pixels so that the start and end can be found. The difference in data size between the PREVIEW and HIGHRES modes is due to the difference in bits per sample (3 versus 5) and the fact that half the number of samples are stored per line in the PREVIEW mode. The PREVIEW mode captures only one field per frame. It captures continuously into the eight buffers in a circular fashion. When required the computer 200 downloads the last filled buffer as chosen by the ASIC 140.

The ASIC 140 controls the outputting of the compressed data stored in the memory 160 to the computer 200 via a standard parallel port 180. The interface between the parallel port 180 and the ASIC 140 includes an 8-bit data path 179a for the compressed samples, a 4-bit control path 179b from the parallel part 180 to the ASIC 140 used by the computer to relay data flow commands to the ASIC 140, and a 5-bit status path 179c used by the ASIC 140 to relay data flow and compression status to the computer 200.

Another input to the ASIC 140 is a clock signal 141h from a crystal 178 running at 28.63 MHz (which is eight times the colorburst frequency of the composite signal 111). The clock signal 141h provides the timing control needed by the ASIC 140 to compress and timestamp the digital video samples.

The computer 200 receives the digital samples 181 from the ASIC via the parallel port 180. The software 220 executing in the computer decompresses the samples in a manner that depends on the system mode. A key feature of the software 220 is that it decompresses the samples without the use of sophisticated phase locked loop circuitry. To do this the software 220 uses landmarks in the digital samples, such as sync and colorburst pulses and timestamps added by the ASIC 140, to reconstruct the frequency of the sine wave carrier modulated by the composite data. The software 220 then aligns the samples with the reconstructed carrier, decompresses the samples and, if necessary, color-space converts the samples to the digital video format supported by the computer 200. For example, if the decompressed samples are formatted as YUV data and the computer displays only RGB data, the software 220 extracts the luminance (Y) and chroma (U and V) information from the decompressed samples and then converts the Y, U and V components to R, G and B components using well-known transforms.

When the system is in PREVIEW mode the software 220 decompresses the video data for each frame as it becomes available. Each displayed frame actually corresponds to only one field. When the system is in HIGHRES mode the software 220 simultaneously processes the decompressed video information from four fields so that the highest-possible still image quality can be obtained from the input video data. One technique employed by the software 220 to obtain high final image quality is to perform frame to frame comparisons to detect and remove motion from the final image. In a preferred motion-detect-and-remove method areas with motion are blocked out and then filled-in with image data decompressed using the less motion-sensitive, PREVIEW mode (i.e., single field) decompression technique. The operation of the ASIC 140 is now described in greater detail in reference to FIG. 3.

Figure 3:
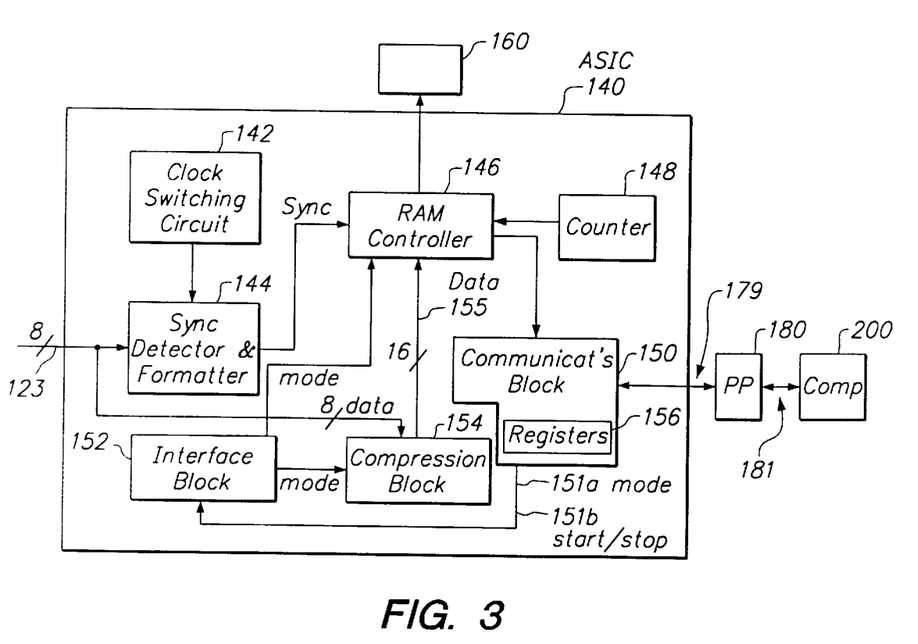
FIG. 3 is an expanded block diagram of the ASIC of FIG. 1.

Referring to FIG. 3, there is shown an expanded block diagram of the ASIC 140 of FIG. 1. This figure shows a preferred embodiment of the ASIC 140, including a clock switching circuit 142, a sync detector and formatter 144, a RAM controller block 146, a counter 148, a communications block 150, an interface block 152 and a compression block 154. The digitized samples 123 from the A/D 122 form the principal input to the ASIC 140. These samples 123 are initially processed by the sync detector 144, which detects the video sync signal at the beginning of each line and field of video data 123 and forms therefrom control signals that are output to the RAM controller 146 and the compression block 154. The sync information allows the color burst and video data to be captured at the correct time along each line.

The communications block 150, incorporating registers 156, receives system mode and control signals 151a, 151b from the computer 200 via the parallel interface 180. The mode 151a, which is at least one of PREVIEW or HIGHRES, is stored in one of the registers 156 and is distributed by the communications block 150 to the interface block 152, which passes the mode 151a to other blocks as needed (e.g, the compression block 154 and the RAM controller block 146). The control signals 151b include START and STOP signals that are stored in the registers 156 and which indicate to the ASIC whether to start or stop a video capture operation, respectively. The control signals 151b are also forwarded to the interface block 152, which relays the signals 151b to the RAM controller block 146. The registers 156 also include status registers which are written by the ASIC 140 and read by the computer 200. The status registers indicate, among other things, which of the eight 64 KB buffers of video data (stored in the memory 160) are to be sent next to the computer for decompression and capture by the software 220 in the PREVIEW mode. Ultimately, all commands/signals described above as being from the computer 200 are issued by driver software 220 that performs the video operations described herein.

The interface block 152 sets the system mode 151a and determines based on the control signals 151b when to start/stop a video capture operation. As mentioned above, the interface block communicates mode and start/stop signals 151a, 151b to the RAM controller block 146 and communicates the mode 151a to the compression block 154. The compression block 154 compresses the digitized samples 123 from the A/D converter 122 in a manner consistent with the mode 151a set by the interface block 152. The compression operation is now described in reference to FIG. 2C, which illustrates the process by which a composite video signal is compressed.

Figure 2C:
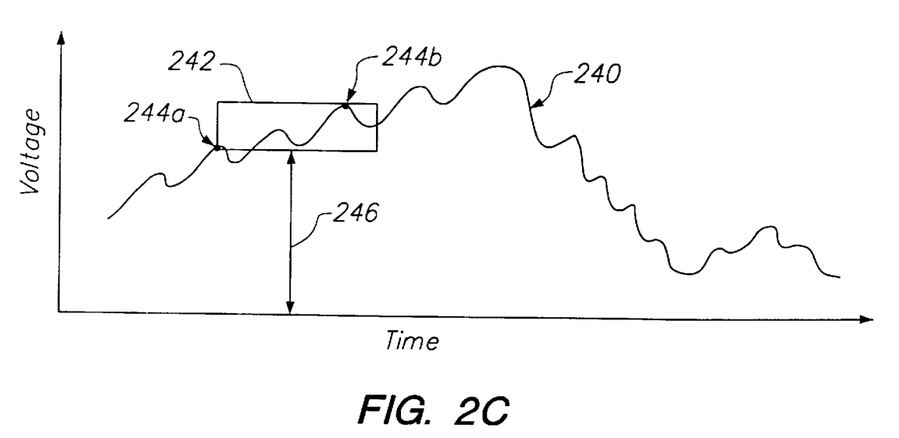
FIG. 2C is a plot of a typical NTSC signal illustrating the digital compression method of the present invention.

Referring to FIG. 2C, there is shown a voltage versus time plot 240 of a representative analog, composite video waveform. In the present compression method a window 242 is first defined in the vicinity of a predetermined segment of the signal data. The width of the window 242 is fixed equal to the time needed to transmit 16 pixels worth of data in the composite signal 111. The bottom edge of the window 242 is set to the smallest peak composite signal value within the window and the top edge of the window is set to the largest peak composite signal value within the window. For each window 242 a minimum amplitude (MINIMUM) 262 is defined equaling the vertical distance between the x-axis and the bottom edge of the window 242 and encoded in 7 bits. Each of the 16 pixels within the window 242 is then encoded with N bits (where N=3 or 5 when the mode is PREVIEW or HIGHRES, respectively). The 2N values corresponding to the N bits are spread evenly throughout the vertical range of the window 242. The height of the window 242 will vary depending on the information content of the signal 111. To accommodate these differences the present compression operation defines a multiplier (MULTIPLIER) 248 that maps each pixel's N-bit value to the correct amount of vertical space within its respective window. For example, a steep curve would have a multiplier 248 larger than the multiplier of a nearly flat curve. The multiplier 248 is encoded with 2 bits. Thus, each of 16 pixels of uncompressed samples received by the compression block 154 is compressed into a block of 16N+2+7 bits (giving 57 bits for the PREVIEW mode and 89 bits for the HIGHRES mode), which provides a significant level of compression. The present compression method is able to provide acceptable accuracy due to the fact that NTSC data tends to exhibit relatively small variations within a given small period of time (e.g., the window 242 width).

The compression block 154 outputs the compressed data 155 to the RAM controller 146 as 16-bit words. PREVIEW and HIGHRES modes use 4 and 6 words, respectively, for each block of 16 data samples. The RAM controller 154 controls how the compressed data 155 is put into and pulled out of the memory 160. As mentioned above, in the PREVIEW mode 8 fields of compressed data can be stored in the half MB memory 160 at once and in the HIGHRES mode 4 fields of compressed data can be stored in the memory 160 at once. The RAM controller 154 is able to identify the beginning of each new line of data due to the sync signal it receives from the sync detector and formatter 144.

The clock switching circuit 142 determines in the PREVIEW mode which of the digitized samples are processed by the other ASIC circuits. In particular, for alternate video lines the clock switching circuit 142 grabs alternating samples. For example, for a first line in a field the clock switching circuit 142 might select even samples and for the a second line it might select odd samples. In this way the amount of data to be processed by the ASIC 140 in the PREVIEW mode is reduced. Using alternate samples from a pair of lines provides the information required to calculate the video signal and colorburst angles that are subsequently used to decode the chrominance information. This operation is not required in the HIGHRES mode, where all available samples 123 are used.

Figure 4:
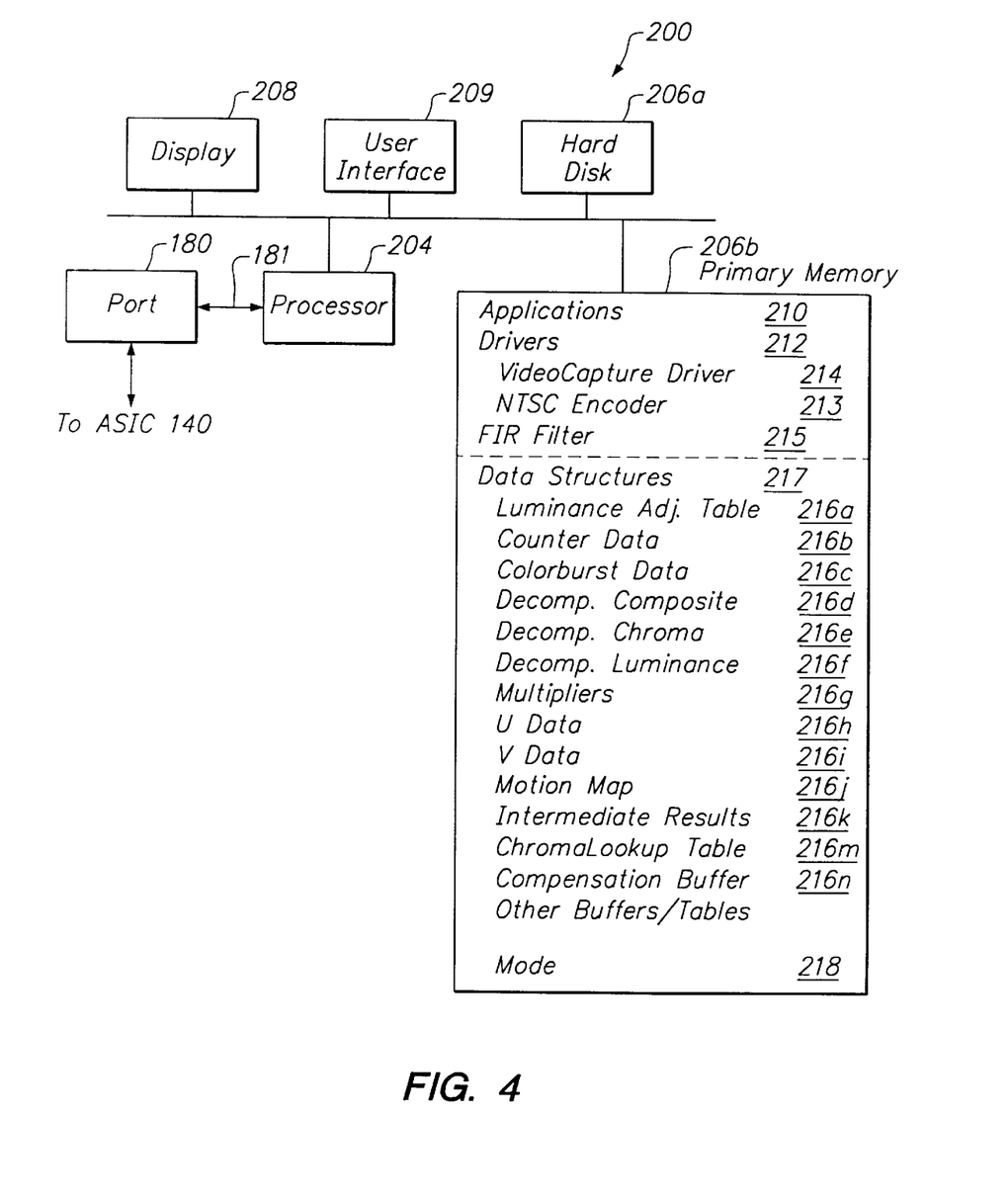
FIG. 4 is an expanded block diagram of the computer/decoding engine 200 of FIG. 1.

The decompression operation performed in the computer 200 is now described in reference to FIG. 4.

Referring to FIG. 4, there is shown a block diagram of the computer 200, which is responsible for setting the mode and controlling the video capture operations of the ASIC 140. The computer 200 also decodes the compressed data received from the ASIC 140 so that the composite video captured by the ASIC 140 can be displayed or stored for other use.

The computer 200 includes a processor 204, a memory 206, which could be a fast, primary memory 206b (e.g., a RAM) or a slower, secondary memory 206a (e.g., a hard disk drive), a display 208 and a user interface 209. The computer 200 operates in accordance with well known computing principles (i.e., the computer 200 executes programs in its memory 106 under the control of an operating system (not shown), which provides system services for the executing programs). In the preferred embodiment, the computer 200 communicates with the ASIC 140 by sending and receiving signals via a standard connector, such as a parallel port 180. In lieu of a parallel port, the computer 200 can employ any other suitable interface, such as the Universal Serial Bus (USB) or Peripheral Component Interface (PCI), to communicate with the ASIC 140. The system mode and when to perform a data capture operation are typically indicated from the user interface 209.

The memory 206 includes application software 210 and drivers 212, including a video capture driver 214 that controls the video capture operations of the ASIC 140 and performs the video decoding operations. The memory 206 also includes data structures 217 that are used by the applications 210 and drivers 212. In particular, the data structures 217 include a luminance adjustment table 216a and tables/buffers for counter data 216b, colorburst data 216c, decompressed composite data 216d, decompressed chrominance, or chroma, data 216e, decompressed luminance data 216f, multipliers 216g used to compress the samples, decompressed U and V color values 216h, 216i, a motion map 216j, intermediate results buffer 216k, chroma lookup table 216m and a compensation buffer 216n. Other data structures 217 include a mode variable 218 that stores the mode set by a user of the video capture driver to either PREVIEW or HIGHRES. Note that the described arrangement of tables and buffers 216 is merely an illustration of what kinds of information are processed by the present invention; in fact, this information can be organized in any way.

The video capture driver 214 employs different methods to decode the compressed samples depending on whether the system is in the PREVIEW or the HIGHRES mode. A common feature for both modes is the fact that the video capture driver 214 regenerates the carrier sine wave associated with the composite signal without the need for PLL circuitry. In the PREVIEW mode, the image is decoded using information from the most recently available Field 1 of a frame. In the HIGHRES mode the image is decoded using information from all of the four fields for the two most recently available frames. The operation of the present invention in the PREVIEW and HIGHRES modes is now described in reference to FIGS. 5–7.

Figures 5, 8:
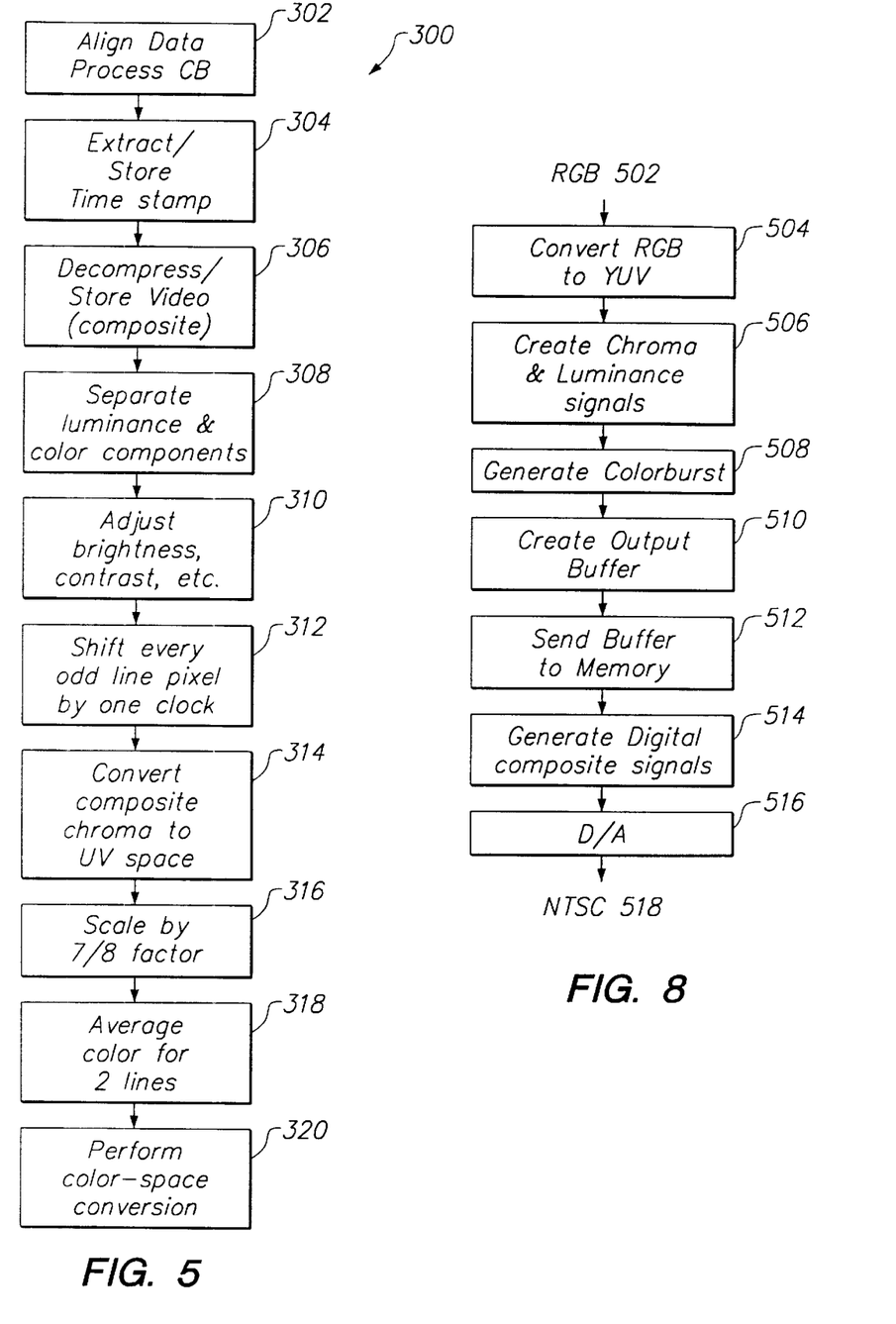
FIG. 5 is a flow diagram of the steps performed by the decoding engine for the PREVIEW mode.
FIG. 8 is a block diagram of an alternative embodiment where digital video data stored on a computer is encoded as an analog NTSC signal.

Referring to FIG. 5, there is shown a flow diagram of the steps of the decoding method 300 performed by the video capture driver 214 for the PREVIEW, or 3-bit, mode. As the first step the driver 214 checks the alignment of the incoming data 181 so that blocks can be easily read out of the memory 160 (step 302). At step 302 the driver 214 also finds and decompresses the colorburst blocks (CB) in the data stream 181 and derives angles from the decompressed CB information. As each new line is received the driver 214 picks off bit 15 (in which timing information is provided) from the first few data blocks and stores the timing information in the counter table 216c (304). The timing information is later used by the driver 214 to sort and correctly align the data to be decoded.

Once aligned, the received data is decompressed (306). This process involves the driver 214 reversing the previously described compression process using the multiplier 248 and minimum amplitude 262 provided with each 16 pixels worth of compressed data 281. The multipliers 248 are also stored into the multiplier buffer 216g (FIG. 4) for later use in removing artifacts from the displayed image. In the preferred embodiment decompression is performed 23 blocks at a time, where each block represents 16 pixels worth of data at 3-bits of video information per pixel.

Once the composite data has been decompressed the driver 214 separates the black and white (luminance) information from the color (chroma) information, which is encoded together in the decompressed, composite signal (308). In the preferred embodiment this operation is performed using a finite impulse response (FIR) filter 215 implemented in software. The operation of the FIR filter 215 is now described in reference to FIG. 6.

Figure 6:
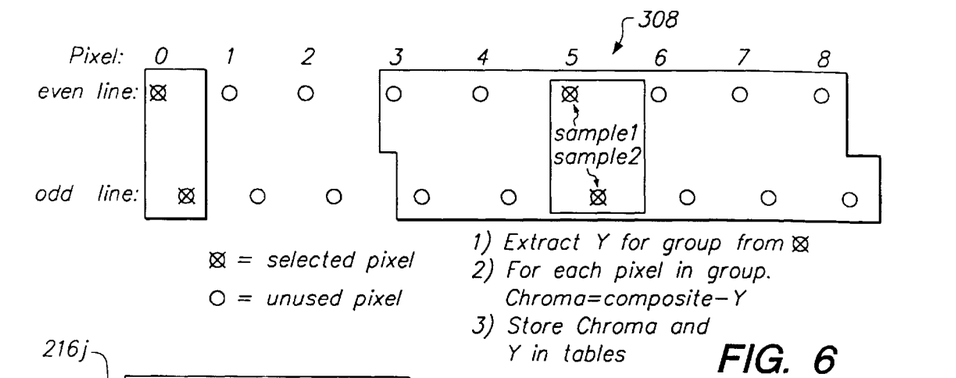
FIG. 6 is a diagram illustrating how decoding is performed on adjacent pairs of lines for the PREVIEW mode.

Referring to FIG. 6, there is shown a pair of lines of decompressed composite pixels. As described above, alternating pixels are present in adjacent lines. In the PREVIEW mode the FIR filter 215 separates the color and luminance (Y) information using every sixth pixel value. That is, the FIR filter 215 needs to operate only once out of each 6 pixels. This is important as a FIR filter 215 is a computationally expensive operation. When executed the FIR filter 215 derives the luminance information from the composite signal. A composite signal has the property that the Composite, Chroma and Luminance (Y) values are represented by the following relationship:

Composite−$Y$=Chroma.

Consequently, given luminance (Y) and composite values a corresponding chroma value can be derived easily. The present invention recognizes that chrominance changes very slowly in comparison to luminance values. Consequently, the luminance and chrominance for an entire group of 12 pixels (shown as boxed pixels) can be derived from 2 luminance values (inner box). This is done by subtracting the luminance value from the data sample of the same pixel to get the chrominance value for that pixel. This chrominance value is assumed to be constant over the 6 pixels outlined (each line is done separately) and can be subtracted from each of the other five composite values to get the luminance value of each. The inner box in FIG. 6 shows the pixels that supply the chrominance information required to calculate the angle of the modulated subcarrier or the colorburst.

The driver 214 then adjusts the brightness, contrast, gamma of the resulting signals and subtracts off a DC offset due to the sync signal by passing the luminance through a luminance adjustment table 216a (310). The values in the luminance adjustment table 216a are generated each time the user selects a new set of brightness, contrast and gamma settings using "sliders" displayed by the driver 214 or some other user-interface.

Due to the one clock pixel shift employed in the PREVIEW mode the next step involves shifting the pixels in each odd line by one clock period or half a PREVIEW mode pixel (312). This aligns luminance data for the final steps. The composite chroma information from step (312) is then separated into distinct U and V color difference values (314). The driver performs this operation for each video line using the following steps:

1) find angle and amplitude for line stored in colorburst data 216c (computed in step 1)
2) use the amplitude to adjust the color saturation level;
3) given the angle and amplitude data obtained from the colorburst data use a lookup table 216m to generate four constants (K1 through K4);
4) multiply the constants (K1 through K4) by the chrominance values from the pixels in the inner box of FIG. 6 (Sample1 and Sample2) to obtain the U and V color difference values for the outer box of FIG. 6 as follows:

$U=K1\times Sample1+K2\times Sample2;$ $V=K3\times Sample1+K4\times Sample2;$ 5) write the U and V values into separate buffers 216h, 216i.

At the completion of this step (314) the Y, U and V buffers 216a, 216h, 216i are populated with data that is subsequently scaled, preferably to 320 lines (step 316).

The color data for adjacent pairs of lines is then averaged to produce average UV values, which tends to correct for anomalies (318). The UV and Y values are then converted to RBG data, if required, using well-known transformations (320).

Figure 7A:
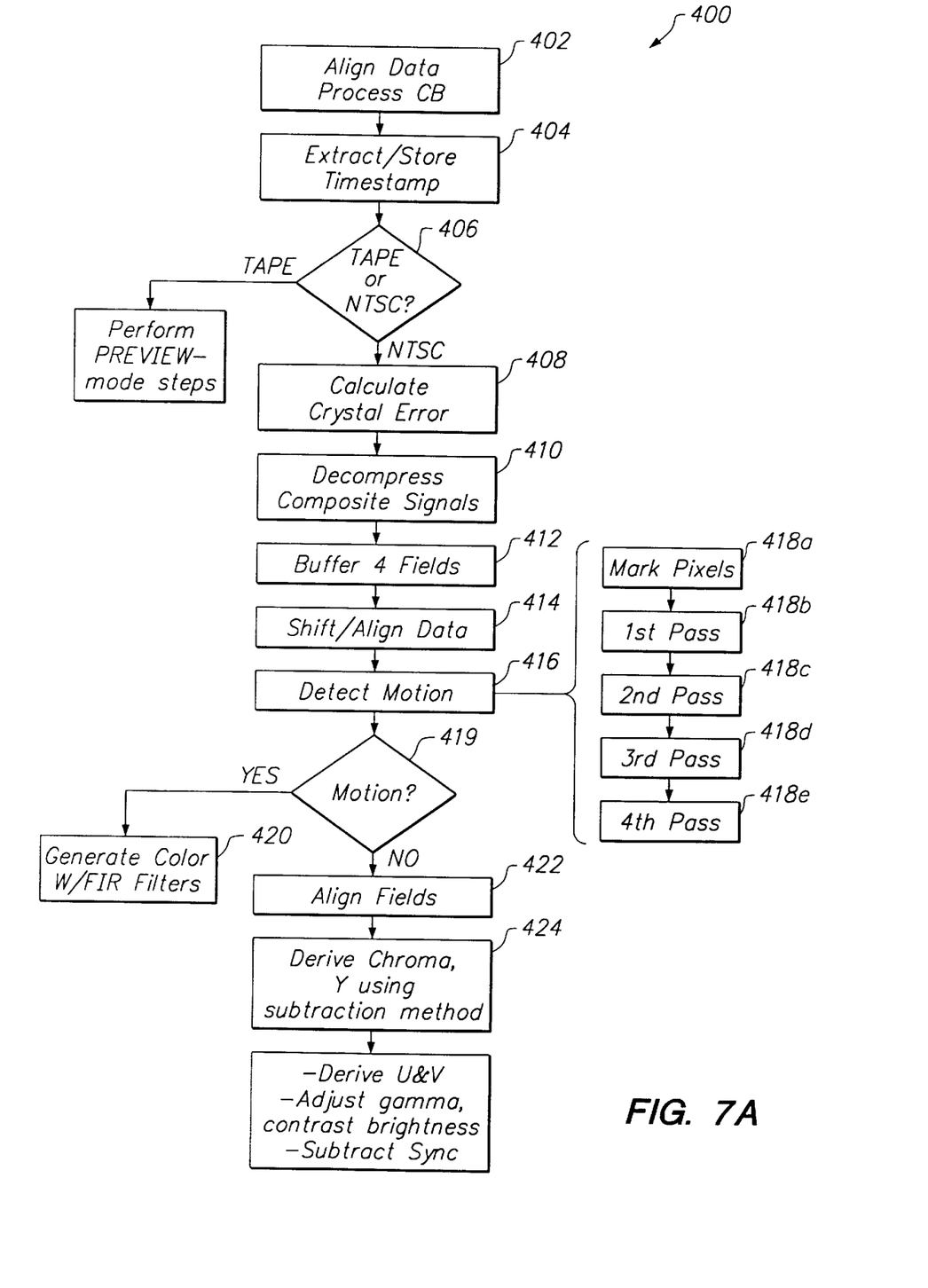
FIG. 7A is a flow diagram of the steps performed by the decoding engine for the high resolution (HIGHRES) mode.

Referring to FIG. 7A, there is shown a flow diagram 400 of the steps performed by the decoding engine 214 for the high resolution (HIGHRES), or 5-bit, mode. The first two steps 402, 404 are the same as for the PREVIEW mode. After the timestamp data is acquired in step 404, the steps taken by the driver 214 depend on the source of the composite signals 111. If the source is a VCR player/recorder (406-tape) the driver 214 performs the decoding steps associated with TAPE mode. The highest quality still images cannot be obtained in TAPE mode due to the positional uncertainty in tape drive mechanisms. For this reason, the present invention employs the same set of steps for TAPE mode as for the PREVIEW mode, which are described in reference to FIG. 5.

If the source is an NTSC source (406-NTSC), such as television transmitter, the driver 214 performs the steps associated with NTSC mode, which provides the highest quality available with the present invention. In the first step in NTSC mode processing the driver 214 calculates the crystal error between the source of the input NTSC signal 111 and the present invention's crystal 178 (408). This value is used to generate a table of colorburst angles 216c for each line that is as accurate as possible. The driver 214 then decompresses the compressed composite data stream 181 using the same method already described for the 3-bit (PREVIEW) mode (410). In the preferred embodiment decompression is performed 46 blocks at a time, where each block represents 16 pixels worth of data at 5-bits of video information per pixel.

The decompressed composite video data for the four most recent fields (i.e, the fields associated with the two frames available immediately after a Capture command is given by a user of the computer 200) are then stored in four buffers 216d (412). The driver 214 then shifts the data in the fields using information from the colorburst and timestamp (counter) tables 216b, 216c so that all data is aligned (414) (i.e., so that corresponding pixels in the different fields are stored at the same relative buffer positions). This shift in values accounts for timing disparities.

The driver 214 then creates a motion map based on differences between the four fields of decompressed composite data (416). This is a multi-pass process wherein one of the fields is first picked as a reference (typically one of the two middle fields) and then it is determined whether the other fields, in whole or part, exhibit motion with respect to the reference. In any region in which there is motion the driver 214 uses only the data from that region of the reference field to generate the YUV values. In any region in which there is no motion the driver 214 uses information from all four fields as source data to generate the captured still image, which results in the best quality picture. The steps of the motion detection process of the present invention are now described in greater detail. Note that, while these steps are described together, the last step actually is performed separately from the other steps. The motion detection process is now described in reference to FIG. 7B, which illustrates the state of a hypothetical motion map 216j after each stage of the motion detection process.

Figure 7B:
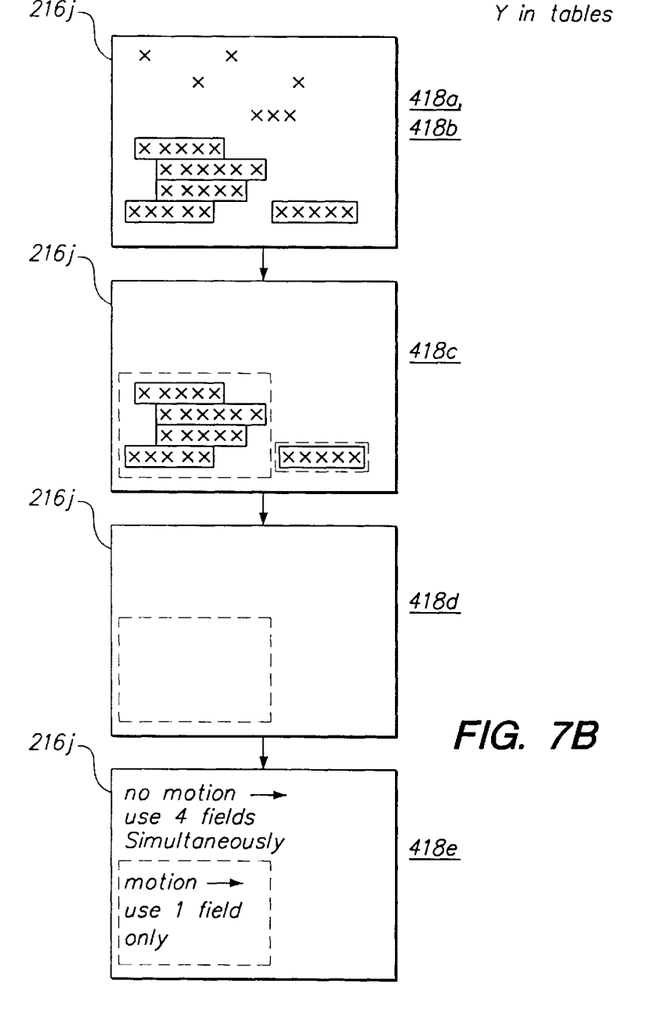
FIG. 7B illustrates the steps 418a through 418e from the flow diagram of FIG. 7A.

As a first step (418a) the driver 214 identifies all pixels (marked with 'x') with motion measured with respect to the reference field, where motion is defined as any difference in the composite values of corresponding pixels that exceeds one or more threshold values. A first flag in a respective entry of the motion map 216j is set if the corresponding pixel has high motion and a second flag is set if the pixel has only moderate motion. In a first pass through the motion map 216j groups of 5 or more neighboring pixels in a row with motion are marked for further motion processing (418b). In a second pass (418c) the marked groups are vertically and horizontally scanned to define a rectangular region (shown as dashed boxes) that encompasses all of the motion in that region. The rectangular regions are then vertically and horizontally scanned (418d) to eliminate regions that are so thin that they are more likely than not due to localized data anomalies. Once the third pass (418d) has been completed the resulting motion map is scanned to determine which source to use for the output in various regions (418e). For example, as shown in FIG. 7B, for the region with motion the output is generated from only the reference field; for the rest of the image the output is generated from the four fields.

For regions with motion (419-YES), color is decoded using the FIR filter method described above for the 3-bit mode (420).

For regions with little or no motion (419-NO) color is generated by subtracting respective composite values in corresponding frames (424). This is a simple process when PLLs are employed to lock to the sine wave carrier but the present invention does not employ PLL circuits. Instead, the present invention manipulates the composite values in software using a method that achieves the same results as the far more expensive PLL-based solutions. This process involves subtracting the data from the two adjacent frames to get chrominance values and adding the data to get luminance values. If the frames were perfectly aligned (with no motion between them) theoretically the 180 degree phase difference between the frames would make it easy to calculate the luminance (Y) and chroma (C) values. However, because of crystal frequency differences and phase shifts between the video source and decoder, the color decoding process involves first correcting all the values in one or the other of the frames so that there is a 180 degree difference between frames.

In the preferred embodiment a frame buffer 216n is used that holds correction values that, when added to one of the frames, will accomplish the alignment of that frame. The first step in creating this compensation buffer 216n is to subtract the two frames and store the result.

The next step is to remove the offset from this difference data 216n that occurs when there are changes in luminance. To do this a new compensation value $s_n$ is calculated for each pixel n as follows:

$$s_n = v_n - (v_{n-1} + v_{n+1}),$$

where $v_n$ is the composite value of the target pixel and $v_{n-1}$ and $v_{n+1}$ are the composite values of, respectively, the adjacent pixels to the left and right of the target pixel.

The remaining steps in the alignment operation (422) include the following:

3) read out an angle for each pair of pixels (n, n+1) using an arctan table and read out a peak to peak value of the compensation data for the same pixel data using a sine table. This provides the angle of the compensation buffer 216n at a known point and the amplitude of the wave. These angle and amplitude values are stored in consecutive bytes in one of the buffers 216 (e.g., the intermediate results buffer 216k);

4) compute a time shift correction factor for the target pixel as follows:

correction=*vmax*×(sin(point+$f\_f/2$)−sin(point−$f\_f/2$)), where vmax is the peak to peak value from step 2), point is the angle from step 2), and $f\_f/2$ is the frame to frame crystal error divided by 2; and 5) the correction is now added or subtracted from the frame that has been defined as the base frame, which is the frame that has its samples in a position that requires the least correction.

As the result of step (422) the phase angles of the four fields are aligned.

The difference is then computed between adjacent frames to derive chrominance information. For example, pixel 1 of field 1, frame 1 is subtracted from pixel 1 of field 1, frame 2. The respective fields are also added to derive luminance (recall that chrominance is 180 degrees out of phase between adjacent frames). The U and V information is derived from the chrominance information as described in reference to step (314) of FIG. 5 and the slider adjustments (to brightness, gamma and contrast) and sync offset subtraction are performed using the luminance as described in reference to step (310) of FIG. 5.

The techniques of the present invention can also be used in reverse. That is, instead of just being used to digitize, encode, store and then decode and capture an analog, composite video stream, the present invention can also be used to encode a digitized video stream in the YUV or RGB format to a composite analog signal that can be displayed on an NTSC- or PAL-compatible device, such as a television. A system and method for performing the reverse operation is now described in reference to FIG. 8.

Referring to FIG. 8, there is shown a high level flow diagram of a digital video to analog composite video (e.g., NTSC) encoding operation that can be performed using the hardware and software of the above-described system with slight and obvious modifications. The input to the system can be an RGB bit map 502 or any other source of digital video signals. The system converts the RGB data to digital YUV data (504) using conventional transforms and then generates digital chroma and luminance signals (506) from the YUV data. The system generates appropriate colorburst signals and then creates a buffer 216 in which each of the components is added, including: the luminance, chrominance and colorburst data for each line and the sync data between lines and fields. Each of the steps (502 to 510) is performed by digital video to NTSC encoding software 213 executing in the computer 200 (FIG. 4). Once these operations are complete, the encoding software 213 transfers the buffer 216 to the memory 160 (FIG. 1) for further processing by the ASIC 140 (512).

In reverse mode operations, using the hardware blocks described in reference to FIG. 3 the ASIC 140 generates a stream of digital composite samples 8-bits at a time (514), which are converted to analog composite video signals (516) by a D/A converter (not shown in FIG. 1). The result is an output NTSC or other composite analog video signal 518. As with the NTSC to RGB decoding operation, an advantage of the described RGB to NTSC operation is that high quality and bandwidth are achieved without the use of expensive circuitry.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A video compression, decompression and capture system for use with analog composite video information in which an image is represented in a series of frames, comprising:

a hardware encoding system configured to convert the analog composite video information into a series of compressed digital composite samples of N bits;

a memory coupled to the hardware encoding system configured to store at least one field of the compressed digital composite samples; and a software decoder configured to receive, decompress and decode the compressed digital composite samples into corresponding digital video signals from which the image can be recreated, the software decoder being configured to perform a high resolution decoding operation wherein the compressed digital composite samples from four fields are simultaneously used to generate the digital video signals without the use of phase locked loop circuitry.

2. The system of claim 1, wherein the software decoder is further configured to perform a preview decoding operation wherein the compressed digital composite samples from one field per frame are used to generate the digital video signals.

3. The system of claim 2, wherein N is 5 for the high resolution decoding operation and 3 for the preview decoding operation.

4. The system of claim 1, wherein the hardware encoding system is further configured to:

extract synch and colorburst information from the analog composite video information, and generate timestamp information for the compressed digital composite samples.

5. A video compression, decompression and capture system for use with analog composite video information in which an image is represented in a series of frames, comprising:

a hardware encoding system configured to convert the analog composite video information into a series of compressed digital composite samples of N bits;

a memory coupled to the hardware encoding system configured to store at least one field of the compressed digital composite samples; and a software decoder configured to receive, decompress and decode the compressed digital composite samples into corresponding digital video signals from which the image can be recreated, the software decoder being configured to perform a high resolution decoding operation wherein the compressed digital composite samples from four fields are simultaneously used to generate the digital video signals without the use of phase locked loop circuitry;

wherein the hardware encoding system is further configured to:

extract synch and colorburst information from the analog composite video information, generate timestamp information for the compressed digital composite samples wherein the high resolution decoding operation comprises the following operations:

processing the colorburst information;

extracting the timestamp information associated with the compressed digital composite signals;

when the analog composite video information is from an NTSC source:

calculating crystal error between the NTSC source and a local crystal used by the hardware encoding system and determining from the crystal error and the colorburst information a set of colorburst angles;

decompressing the compressed composite digital samples to form decompressed samples;

shifting and aligning data in four fields of the decompressed samples using the timestamp information and the colorburst angles;

detecting motion in the image based on differences between the four fields;

when motion is detected in a particular region of the image:

generating color data for the particular region using the decompressed samples from a single, reference field;

when motion is not detected:

aligning phase angles of the decompressed samples from the four fields;

deriving chrominance (chroma) information by subtracting the decompressed samples from two adjacent frames and deriving luminance (Y) information by adding the decompressed samples from the two adjacent frames;

deriving U and V information from the chroma information; and subtracting from the Y information a DC offset due to the synch information.

6. The system of claim 5, wherein the high resolution decoding operation further comprises: when the analog composite video information is not from an NTSC source, using the compressed digital composite samples from one field per frame to generate the digital video signals.

7. The system of claim 5, wherein the operation of detecting motion in the image comprises:

selecting one of the four fields as the reference field;

determining whether at least a part of any number of other fields not the reference field exhibits motion relative to the reference field.

8. The system of claim 7, wherein the operation of determining whether at least a part of any number of other fields exhibits motion relative to the reference field operation comprises:

generating a motion map indicating all pixels in any of the other fields with motion measured with respect to the reference field;

in a first pass, marking in the motion map groups of 5 or more neighboring pixels in a row with motion;

in a second pass, vertically and horizontally scanning the groups marked in the first pass to define rectangular regions that encompass all motion in the respective regions;

in a third pass, vertically and horizontally scanning the regions defined in the second pass and eliminating from the motion map the regions that are likely due to localized data anomalies; and in a fourth pass, scanning the motion map generated by third pass to determine particular regions that include motion and those that do not.

9. The system of claim 5, wherein the operation of aligning the phase angles of the four fields; comprises:

subtracting the two frames;

removing from the difference of the two frames an offset that occurs when there is a change in luminance across neighboring pixels in a line;

determining an angle for each pair of pixels;

determining a peak to peak value for each pair of pixels;

computing a time shift correction factor for each pixel using the peak to peak value, the angle and the crystal error;

applying the correction factor to the frame defined as base frame.

10. The system of claim 9, wherein the base frame comprises the frame whose samples are in a position requiring the least phase angle alignment.

11. The system of claim 9, wherein:

determining the angle for each pair of pixels comprises determining an arctan of the pair of pixels; and determining the peak to peak value for each pair of pixels comprises determining a sine of the pair of pixels.

12. The system of claim 9, wherein:

the operation of computing a time shift correction factor for each of the pixels comprises determining the following:

$$\text{time shift correction factor} = vmax \times (\sin(\text{point} + f\_f/2) - \sin(\text{point} - f\_f/2))$$

where vmax is the peak to peak value, point is the angle, and f_f/2 is the crystal error divided by two.

13. The system of claim 3, where the preview decoding operation comprises the following operations:

extracting synch and colorburst information from the analog composite video information;

generating timestamp information for the compressed digital composite samples;

processing the colorburst information to derive colorburst angles;

extracting the timestamp information associated with the compressed digital composite signals;

decompressing the digital video samples;

separating luminance and chrominance components in the decompressed digital video samples;

shifting every odd line pixel by one clock;

converting the chrominance components to UV space; and scaling the results of the UV converting operation to an appropriate number of output lines;

averaging color for each pair of the output lines; and when it is necessary that the composite digital signal are RGB signals, performing color space conversion from YUV space to RGB space.

14. A video compression, decompression and capture system for use with analog composite video information in which an image is represented in a series of frames, comprising:

a hardware encoding system configured to convert the analog composite video information into a series of compressed digital composite samples of N bits;

a memory coupled to the hardware encoding system configured to store at least one field of the compressed digital composite samples;

a software decoder configured to receive, decompress and decode the compressed digital composite samples into corresponding digital video signals from which the image can be recreated, the software decoder being configured to perform a high resolution decoding operation wherein the compressed digital composite samples from four fields are simultaneously used to generate the digital video signals without the use of phase locked loop circuitry;

wherein the software decoder is further configured to perform a preview decoding operation wherein the compressed digital composite samples from one field per frame are used to generate the digital video signals;

wherein N is 5 for the high resolution decoding operation and 3 for the preview decoding operation;

where the preview decoding operation comprises the following operations;

extracting synch and colorburst information from the analog composite video information;

generating timestamp information for the compressed digital composite samples;

processing the colorburst information to derive colorburst angles;

extracting the timestamp information associated with the compressed digital composite signals:

decompressing the digital video samples;

separating luminance and chrominance components in the decompressed digital video samples;

shifting every odd line pixel by one clock;

converting the chrominance components to UV space; and scaling the results of the UV converting operation to an appropriate number of output lines;

averaging color for each pair of the output lines; and when it is necessary that the composite digital signal are RGB signals, performing color space conversion from YUV space to RGB space;

wherein the operation of separating the luminance and chrominance components comprises:

applying a FIR filter to a decompressed composite value for every sixth pixel to derive the luminance component of the every sixth pixel; and generating the chrominance components for each of the pixels in a 2×6 group of pixels by:

subtracting the luminance component for the sixth pixel from the decompressed composite value for the sixth pixel to determine the chrominance component for the sixth pixel; and subtracting the chrominance component from the decompressed composite value for other pixels in the 2×6 group to determine the luminance values for the other pixels.

15. The system of claim 14, wherein the operation of converting the chrominance components to UV space comprises:

finding angle and amplitude for each line stored in the colorburst data;

using the amplitude to adjust color saturation level;

using the angle and amplitude to generate four constants (K1, K2, K3 and K4); and multiplying the four constants by the chrominance values from the pixels to obtain the U and V color difference values as follows:

$U = K1 \times Sample1 + K2 \times Sample2$; and $V = K3 \times Sample1 + K4 \times Sample2$; where Sample1 and Sample2 are the chrominance values of respective ones of the sixth pixels from the 2×6 group.

16. A video compression, decompression and capture system for use with analog composite video information in which an image is represented in a series of frames, comprising:

a hardware encoding system configured to convert the analog composite video information into a series of compressed digital composite samples of N bits;

a memory coupled to the hardware encoding system configured to store at least one field of the compressed digital composite samples;

a software decoder configured to receive, decompress and decode the compressed digital composite samples into corresponding digital video signals from which the image can be recreated, the software decoder being configured to perform a high resolution decoding operation wherein the compressed digital composite samples from four fields are simultaneously used to generate the digital video signals without the use of phase locked loop circuitry;

wherein the software decoder is further configured to perform a preview decoding operation wherein the compressed digital composite samples from one field per frame are used to generate the digital video signals;

wherein the hardware encoding system is configured to convert the analog composite video information into the series of compressed digital composite samples of N bits by:

defining a fixed window whose width is equal to the time needed to transmit M pixels worth of data in the analog composite video information;

defining a top edge and a bottom edge for the fixed window sufficient to encompass the amplitudes of the M pixels worth of data;

encoding an amplitude of each of the M pixels worth of data with a respective N-bit value corresponding to the relative position in the window of the amplitude, the N-bit value corresponding to one of the compressed digital composite samples;

defining a minimum amplitude for the fixed window equaling the distance between an amplitude axis and the bottom edge;

defining a single multiplier for the fixed window that maps each of the N-bit values to actual vertical position in the fixed window of a respective pixel;

the hardware encoding system being further configured to package as a block for storage in the memory the M compressed digital composite samples, the minimum amplitude and the multiplier.

17. The system of claim 16, wherein:

M is selected so that the composite video information within the fixed window exhibits relatively small variations.

18. The system of claim 17, wherein M is 16.

19. The system of claim 1, wherein the hardware encoding system comprises:

input analog to digital conversion circuitry configured to low pass filter and digitally sample the analog composite video information and to output a corresponding set of P-bit digital samples, where P is greater than N;

a crystal configured to generate a clock signal with a clock frequency that is eight times a colorburst frequency associated with the input analog composite video signal; and an ASIC coupled to the analog to digital conversion circuitry, the memory and the crystal, the ASIC being configured to:

detect synch and colorburst information in the digital samples, generate the compressed digital video samples from the digital samples, generate colorburst samples and timestamps for blocks of the compressed digital video samples using the clock signal and the synch and colorburst information,
generate a unique identifier for each of the blocks; and
store the blocks of compressed digital samples in the memory in association with the colorburst samples, timestamps and identifiers.

20. The system of claim 19, wherein:
when the system is configured to perform the high resolution operation, the memory is able to store 4 frames worth of the blocks of compressed digital samples in the memory in association with the respective colorburst samples, timestamps and identifiers; and
when the system is configured to perform the preview decoding operation, the memory is able to store 8 frames worth of the blocks of compressed digital samples in the memory in association with the respective colorburst samples, timestamps and identifiers.

21. The system of claim 19, wherein the ASIC comprises:
a clock switching circuit that determines for the preview decoding operation which of digital samples are to be processed;
a sync detector and formatter that detects the synch information identifying the beginning of one video line and generates a corresponding sync control signal;
an interface block that sets an operating mode;
a compression block configured to generate the compressed digital samples and the colorburst samples from the digital samples in accordance with the operating mode and the sync control signal;
a free running counter configured to generate the timestamps;
a RAM controller configured to:
store the compressed digital samples in the memory using a plurality of buffers in accordance with the sync control signal, a count generated by the counter and the operating mode, and
to read out the buffers;
status registers indicating which of the buffers is to be read out by the RAM controller; and
a communication block configured to:
interact via a parallel port with a computer in which the software decoder is executing;
set the state of the status registers in accordance with instructions from the computer; and
send the read out buffers to the computer via the parallel port for operation on therein by the software decoder.

22. A computer program product for use in a video display system, the computer program product comprising a computer readable storage medium and a computer program mechanism embedded therein, the computer program mechanism including:
a high resolution decoding procedure configured to:
decompress and simultaneously decode compressed digital composite samples obtained from four fields of analog composite video information; and
generate, without the use of phase locked loop circuitry, a single set of digital video signals from which a single, high resolution frame of the image represented by the four fields can be displayed by the video display system.

23. The computer program product of claim 22, wherein the computer program mechanism further comprises:
a preview decoding procedure configured to:
decompress the compressed digital composite samples obtained from one field of the analog composite video information; and
generate a single set of digital video signals from which a single preview resolution frame of the image represented by the one field can be displayed by the video display system.

24. A video compression, decompression and capture method for use with analog composite video information in which an image is represented in a series of frames, comprising the steps of:
converting the analog composite video information into a series of compressed digital composite samples of N bits; and
decompressing and decoding the compressed digital composite samples into corresponding digital video signals from which the image can be recreated, including performing a high resolution decoding operation wherein the compressed digital composite samples from four fields are simultaneously used to generate the digital video signals without the use of phase locked loop circuitry.

25. The method of claim 24, further comprising the step of performing a preview decoding operation that includes: using the compressed digital composite samples from one field per frame to generate the digital video signals.

26. The method of claim 24, further comprising the steps of:
extracting synch and colorburst information from the analog composite video information, and
generating timestamp information for the compressed digital composite samples.

27. A video compression, decompression and capture method for use with analog composite video information in which an image is represented in a series of frames, comprising the steps of:
converting the analog composite video information into a series of compressed digital composite samples of N bits;
decompressing and decoding the compressed digital composite samples into corresponding digital video signals from which the image can be recreated, including performing a high resolution decoding operation wherein the compressed digital composite samples from four fields are simultaneously used to generate the digital video signals without the use of phase locked loop circuitry;
extracting synch and colorburst information from the analog composite video information, and
generating timestamp information for the compressed digital composite samples;
wherein the high resolution decoding operation further comprises the steps of:
processing the colorburst information;
extracting the timestamp information associated with the compressed digital composite signals;
when the analog composite video information is from an NTSC source:
calculating crystal error between the NTSC source and a local crystal used by the hardware encoding system and determining from the crystal error and the colorburst information a set of colorburst angles;
decompressing the compressed composite digital samples to form decompressed samples;

shifting and aligning data in four fields of the decompressed samples using the timestamp information and the colorburst angles;

detecting motion in the image based on differences between the four fields;

when motion is detected in a particular region of the image:

generating color data for the particular region using the decompressed samples from a single, reference field;

when motion is not detected:

aligning phase angles of the decompressed samples from the four fields;

deriving chrominance (chroma) information by subtracting the decompressed samples from two adjacent frames and deriving luminance (Y) information by adding the decompressed samples from the two adjacent frames;

deriving U and V information from the chroma information; and subtracting from the Y information a DC offset due to the synch information.

28. The method of claim 27, wherein the high resolution decoding step further comprises the step of: when the analog composite video information is not from an NTSC source, using the compressed digital composite samples from one field per frame to generate the digital video signals.

29. The method of claim 27, wherein the step of detecting motion in the image comprises the steps of:

selecting one of the four fields as the reference field;

determining whether at least a part of any number of other fields not the reference field exhibits motion relative to the reference field.

30. The method of claim 29, wherein the step of determining whether at least a part of any number of other fields exhibits motion relative to the reference field comprises the steps of:

generating a motion map indicating all pixels in any of the other fields with motion measured with respect to the reference field;

in a first pass, marking in the motion map groups of 5 or more neighboring pixels in a row with motion;

in a second pass, vertically and horizontally scanning the groups marked in the first pass to define rectangular regions that encompass all motion in the respective regions;

in a third pass, vertically and horizontally scanning the regions defined in the second pass and eliminating from the motion map the regions that are likely due to localized data anomalies; and in a fourth pass, scanning the motion map generated by third pass to determine particular regions that include motion and those that do not.

31. The method of claim 27, wherein the step of aligning the phase angles of the four fields; comprises:

subtracting the two frames;

removing from the difference of the two frames an offset that occurs when there is a change in luminance across neighboring pixels in a line;

determining an angle for each pair of pixels;

determining a peak to peak value for each pair of pixels;

computing a time shift correction factor for each pixel using the peak to peak value, the angle and the crystal error;

applying the correction factor to the frame defined as base frame.

32. The method of claim 25, where the preview decoding operation comprises the steps of:

extracting synch and colorburst information from the analog composite video information;

generating timestamp information for the compressed digital composite samples;

processing the colorburst information to derive colorburst angles;

extracting the timestamp information associated with the compressed digital composite signals;

decompressing the digital video samples;

separating luminance and chrominance components in the decompressed digital video samples;

shifting every odd line pixel by one clock;

converting the chrominance components to UV space; and scaling the results of the UV converting operation to an appropriate number of output lines;

averaging color for each pair of the output lines; and when it is necessary that the composite digital signal are RGB signals, performing color space conversion from YUV space to RGB space.

33. A video compression, decompression and capture method for use with analog composite video information in which an image is represented in a series of frames, comprising the steps of:

converting the analog composite video information into a series of compressed digital composite samples of N bits;

decompressing and decoding the compressed digital composite samples into corresponding digital video signals from which the image can be recreated, including performing a high resolution decoding operation wherein the compressed digital composite samples from four fields are simultaneously used to generate the digital video signals without the use of phase locked loop circuitry;

performing a preview decoding operation that includes: using the compressed digital composite samples from one field per frame to generate the digital video signals;

where the preview decoding operation comprises the steps of:

extracting synch and colorburst information from the analog composite video information;

generating timestamp information for the compressed digital composite samples;

processing the colorburst information to derive colorburst angles;

extracting the timestamp information associated with the compressed digital composite signals;

decompressing the digital video samples;

separating luminance and chrominance components in the decompressed digital video samples;

shifting every odd line pixel by one clock;

converting the chrominance components to UV space; and scaling the results of the UV converting operation to an appropriate number of output lines;

averaging color for each pair of the output lines; and when it is necessary that the composite digital signal are RGB signals, performing color space conversion from YUV space to RGB space;

wherein the step of separating the luminance and chrominance components comprises the steps of:

applying a FIR filter to a decompressed composite value for every sixth pixel to derive the luminance component of the every sixth pixel; and generating the chrominance components for each of the pixels in a 2×6 group of pixels by:

subtracting the luminance component for the sixth pixel from the decompressed composite value for the sixth pixel to determine the chrominance component for the sixth pixel; and subtracting the chrominance component from the decompressed composite value for other pixels in the 2×6 group to determine the luminance values for the other pixels.

34. The method of claim 33, wherein the step of converting the chrominance components to UV space comprises:

finding angle and amplitude for each line stored in the colorburst data;

using the amplitude to adjust color saturation level;

using the angle and amplitude to generate four constants (K1, K2, K3 and K4); and multiplying the four constants by the chrominance values from the pixels to obtain the U and V color difference values as follows:

$$U = K1 \times Sample1 + K2 \times Sample2;\ and$$

$$V = K3 \times Sample1 + K4 \times Sample2;\ where$$

Sample1 and Sample2 are the chrominance values of respective ones of the sixth pixels from the 2×6 group.

* * * * *